US012656878B2

(12) United States Patent
Zhou et al.

(10) Patent No.:     US 12,656,878 B2
(45) Date of Patent:         Jun. 16, 2026

(54) TECHNIQUES FOR MANIPULATING THREE-DIMENSIONAL OBJECTS USING MULTIPLE HANDS IN EXTENDED REALITY ENVIRONMENTS

(71) Applicant: AUTODESK, INC., San Francisco, CA (US)

(72) Inventors: Qian Zhou, Toronto (CA); Fraser Anderson, Newmarket (CA); George William Fitzmaurice, Toronto (CA); Ken Jen Lee, Kitchener (CA); David Ledo Maira, Toronto (CA)

(73) Assignee: AUTODESK, INC., San Francisco, CA (US)

( * ) Notice:    Subject to any disclaimer, the term of this patent is extended or adjusted under 35 U.S.C. 154(b) by 0 days.

(21) Appl. No.: 18/641,176

(22) Filed:    Apr. 19, 2024

(65)        Prior Publication Data

US 2025/0328196 A1     Oct. 23, 2025

(51) Int. Cl.
| | |
|---|---|
| *G06F 3/01* | (2006.01) |
| *G06T 13/40* | (2011.01) |
| *G06T 19/20* | (2011.01) |

(52) U.S. Cl.
CPC .............. *G06F 3/017* (2013.01); *G06F 3/011* (2013.01); *G06T 13/40* (2013.01); *G06T 19/20* (2013.01); *G06T 2219/2004* (2013.01)

(58) Field of Classification Search
CPC .......... G06F 3/017; G06F 3/011; G06T 13/40; G06T 19/20; G06T 2219/2004; G06T 19/006
See application file for complete search history.

(56)        References Cited

U.S. PATENT DOCUMENTS

| | | | |
|---|---|---|---|
| 7,333,112 B2 * | 2/2008 | Anderson | ............... G06T 13/40 |
| | | | 345/473 |
| 7,437,684 B2 * | 10/2008 | Maille | ..................... G06T 13/40 |
| | | | 703/2 |

(Continued)

FOREIGN PATENT DOCUMENTS

| | | |
|---|---|---|
| CN | 115587396 A | 1/2023 |

OTHER PUBLICATIONS

International Search Report for Application No. PCT/US2025/025035 dated Jul. 29, 2025.

(Continued)

*Primary Examiner* — Grant Sitta
(74) *Attorney, Agent, or Firm* — Artegis Law Group, LLP

(57)        ABSTRACT

Techniques are disclosed for posing three-dimensional (3D) objects in extended reality (XR) environments using multiple hands. In some embodiments, an animation application selects a posing mode based on user interactions and adjusts joints and/or bones associated with a 3D object based on the posing mode and the user interactions. The posing mode can be a symmetric bimanual posing mode in which two joints are selected and adjusted simultaneously, an asymmetric bimanual posing mode a reference joint is selected with one hand to serve as a pivot while a second joint is adjusted by another hand, a virtual hand posing mode in which virtual hands are created to fix joints in place, or a bone manipulation mode in which bones can be selected and adjusted, with adjustments to the bones influencing joints that are connected to the bones.

19 Claims, 13 Drawing Sheets

(56) References Cited

U.S. PATENT DOCUMENTS

| | | | | |
|---|---|---|---|---|
| 8,581,901 | B2 * | 11/2013 | Joshi | G06T 19/20 |
| | | | | 382/285 |
| 12,380,621 | B2 * | 8/2025 | Agrawal | G06T 13/40 |
| 2003/0034980 | A1 * | 2/2003 | Imagawa | G06T 19/20 |
| | | | | 345/474 |
| 2004/0257368 | A1 * | 12/2004 | Anderson | G06T 13/40 |
| | | | | 345/473 |
| 2015/0193945 | A1 * | 7/2015 | Baek | G06F 3/011 |
| | | | | 345/474 |
| 2017/0329488 | A1 * | 11/2017 | Welker | G06F 3/011 |
| 2018/0165864 | A1 * | 6/2018 | Jin | G06F 3/0346 |
| 2018/0225858 | A1 * | 8/2018 | Ni | G06T 15/20 |
| 2019/0381404 | A1 * | 12/2019 | Buttner | A63F 13/60 |
| 2020/0372716 | A1 * | 11/2020 | Murata | G06T 19/006 |
| 2020/0402284 | A1 * | 12/2020 | Saragih | G06V 10/757 |
| 2021/0383585 | A1 * | 12/2021 | Zhao | G06F 18/214 |
| 2023/0267668 | A1 * | 8/2023 | Starke | G06T 13/40 |
| 2024/0070517 | A1 * | 2/2024 | Atherton | G06N 3/09 |
| 2024/0144573 | A1 * | 5/2024 | Agrawal | G06T 13/40 |
| 2024/0177387 | A1 * | 5/2024 | Smith | G06T 7/20 |
| 2024/0265656 | A1 * | 8/2024 | Victor-Faichney | G06F 3/011 |
| 2025/0037399 | A1 * | 1/2025 | Bae | G06F 3/04845 |

OTHER PUBLICATIONS

Oshita, Masaki, "Multi-Touch Interface for Character Motion Control Using Example-Based Posture Synthesis", WSCG Communication Proceedings, 2012, pp. 213-222.

* cited by examiner

From 902

903

Select two joints associated with 3D object based on user interactions with the joints — 1001

Adjust the selected joints based on the user interactions with the joints — 1002

Compute movements and adjust other connected joints and bones — 1003

To 904

From 902

903

Select one or more joints associated 3D object to be fixed with virtual hand(s) based on one or more user interactions        1201

Adjust a joint based on another user interaction        1202

Compute movements and adjust other connected joints and bones        1203

To 904

From 902

903

Select a bone associated with 3D object based on user interaction ⌐ 1301

Adjust the selected bone based on the user interaction ⌐ 1302

Compute movements and adjust other connected joints and bones based on joints connected to the bone ⌐ 1303

To 904

TECHNIQUES FOR MANIPULATING THREE-DIMENSIONAL OBJECTS USING MULTIPLE HANDS IN EXTENDED REALITY ENVIRONMENTS

BACKGROUND

Technical Field

Embodiments of the present disclosure relate generally to computer science and interactive three-dimensional animation and, more specifically, to techniques for manipulating three-dimensional objects using multiple hands in extended reality environments.

Description of the Related Art

Three-dimensional (3D) animations are animations of computer-generated objects in virtual 3D spaces. One conventional approach for creating 3D animations on computers involves posing virtual 3D objects in a number of keyframes and generating frames between the keyframes via an interpolation process. To pose a 3D object, a user can select and manipulate joints associated with the 3D object, adjusting parameters such as the translation and rotation of those joints in 3D, to achieve a desired pose of the 3D object. Each joint (also sometimes referred to as an "effector") is typically controlled through one or more gizmos—3D user interface widgets that provide visual cues for manipulation via the user interface.

Extended reality (XR) systems provide immersive virtual or augmented environments in which users can interact with virtual 3D objects as if the objects were real. Examples of XR devices include augmented reality (AR) devices and virtual reality (VR) devices. As used herein, AR refers to a view of the physical environment with an overlay of one or more computer-generated graphical elements, including mixed reality (MR) environments in which physical objects and computer-generated elements can interact. As used herein, VR refers to a virtual environment that includes computer-generated elements.

One conventional approach for posing a 3D object within an XR environment allows a user to manipulate one joint associated with the 3D object at a time in a VR environment, which is akin to the posing on a computer, described above. One drawback of requiring a user to manipulate one joint at a time within a VR environment is that this approach can make it difficult to pose 3D objects with complex or nuanced poses that require simultaneous changes to multiple parts of a 3D object. For example, creating a dynamic pose where a character is throwing an object while looking in another direction can be cumbersome, as a user would have to adjust each limb sequentially rather than in concert.

Another drawback of requiring a user to manipulate one joint at a time within a VR environment is that this approach differs from how users ordinarily interact with physical objects by, for example, grabbing larger portions of those object rather than joints that are relatively small in size. Because manipulating one joint at a time is oftentimes difficult and unnatural to users, there can be a disconnect between the intent of a user when creating the pose of a 3D object and the actual pose of the 3D object.

As the foregoing illustrates, what is needed in the art are more effective techniques for 3D posing in XR environments.

SUMMARY

One embodiment of the present disclosure sets forth a computer-implemented method for posing an object. The method includes receiving, within an extended reality (XR) environment, one or more interactions of a plurality of hands with at least one of one or more joints or one or more bones associated with the object. The method further includes computing one or more movements of at least one portion of the object based on the one or more interactions.

Other embodiments of the present disclosure include, without limitation, one or more computer-readable media including instructions for performing one or more aspects of the disclosed techniques as well as one or more computing systems for performing one or more aspects of the disclosed techniques.

At least one technical advantage of the disclosed techniques relative to the prior art is the disclosed techniques permit the simultaneous manipulation of multiple joints or entire bones associated with a 3D object using two or more hands, which can include virtual hand(s). The simultaneous manipulation of multiple joints or entire bones using two or more hands enables relatively intuitive and efficient posing of 3D objects within XR environments. Furthermore, the disclosed techniques allow users to pose 3D objects using gestures and movements that are instinctive and reflective of real-world interactions, which can enhance the realism and expressiveness of 3D object poses. These technical advantages represent one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

System Overview

Figure 1:
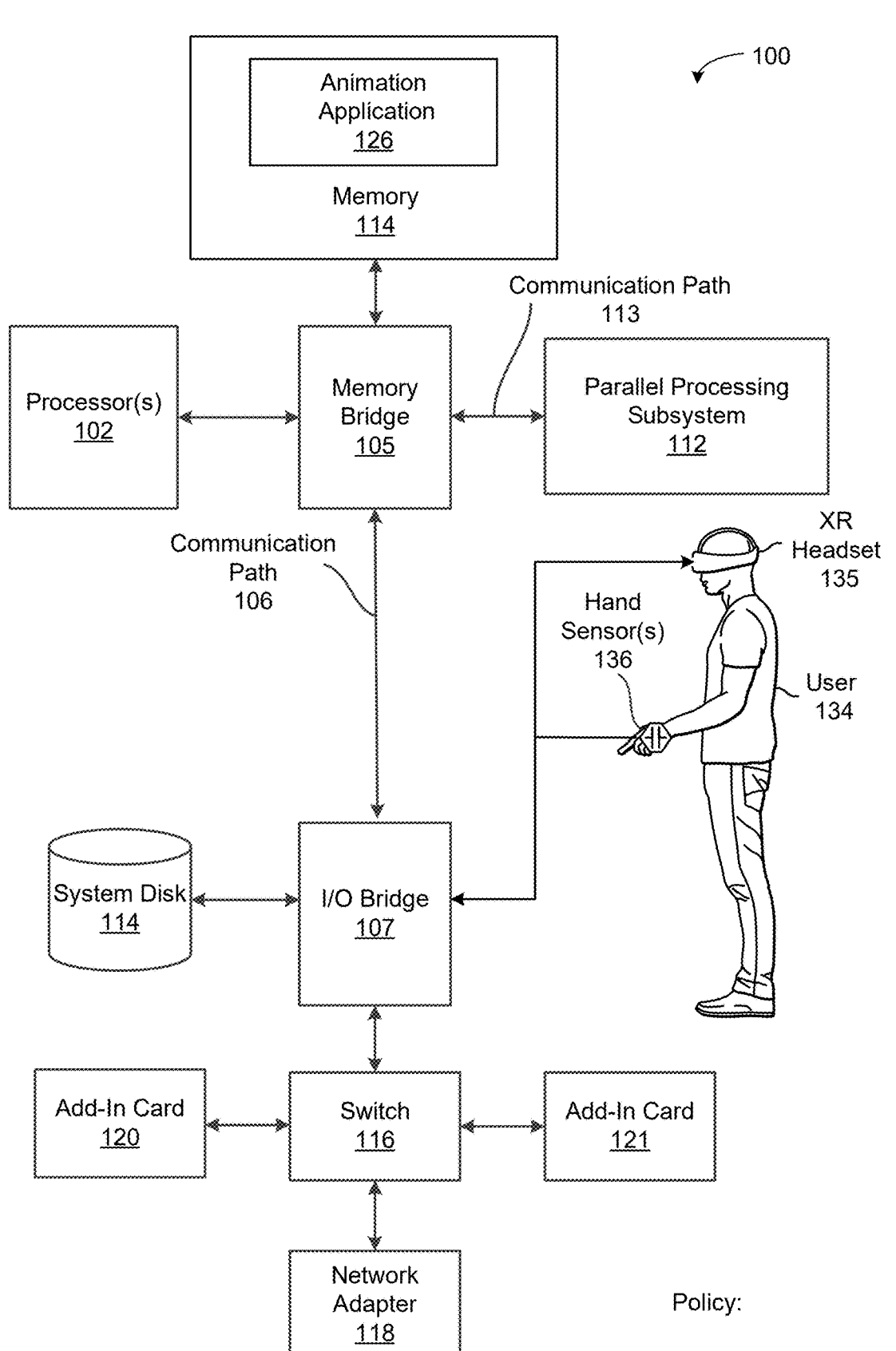
FIG. 1 illustrates a block diagram of a computing system configured to implement one or more aspects of the various embodiments.

FIG. 1 illustrates a block diagram of a computing system 100 configured to implement one or more aspects of the various embodiments. Computing system 100 can include any type of computing device, including, without limitation, a server machine, a server platform, a desktop machine, a laptop machine, a hand-held/mobile device, a digital kiosk, an in-vehicle infotainment system, and/or a wearable device. In some embodiments, a computing system 100 is a server machine operating in a data center or a cloud computing environment that provides scalable computing resources as a service over a network.

In some embodiments, computing system 100 includes, without limitation, processor(s) 102 and memory(ies) 114 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In some embodiments, I/O bridge 107 is configured to receive user 134 input information from XR headset 135 and one or more hand sensor(s) 136 (e.g., evaluating gestures, speech, or other information about one or more uses in a field of view or sensory field of one or more sensors), and/or the like, and forward the input information to processor(s) 142 for processing. In some embodiments, computing system 100 may be a server machine in a cloud computing environment. In such embodiments, computing system 100 may not include XR headset 135 and one or more hand sensor(s) 136, but can receive equivalent input information by receiving commands (e.g., responsive to one or more inputs from a remote computing device) in the form of messages transmitted over a network and received via the network adapter 118. In some embodiments, switch 116 is configured to provide connections between I/O bridge 107 and other components of the computing system 100, such as a network adapter 118 and various add in cards 120 and 121. XR headset 135 is described in greater detail below in conjunction with FIG. 2.

One or more hand sensors 136 detect and track the hand movements and gestures of user 134. One or more hand sensors 136 can be part of or connected to the XR headset 135. One or more hand sensors 136 monitor various hand actions, such as pinching, grabbing, waving, and/or the like, that user 134 performs in physical space. In various embodiments, the data from the hand movements is sent through communication path 106 to the one or more processor(s) 102, which is then interpreted by an animation application 126 to process the actions within the virtual environment, as discussed in greater detail below in conjunction with FIGS. 3-13. One or more hand sensor(s) 136 use various technologies to track hand movements of user 134. For example, optical sensors could use cameras to follow the position and orientation of hands in 3D space, translating gestures into digital inputs. As another example, infrared sensors could detect heat signatures and movements, while gyroscopes and accelerometers measure orientation and acceleration, respectively. As a further example, capacitive sensors could be used to detect touch and proximity by measuring changes in electrical fields, allowing for nuanced control over virtual interactions.

In some embodiments, I/O bridge 107 is coupled to a system disk 114 that may be configured to store content and applications and data for use by processor(s) 102 and parallel processing subsystem 112. In some embodiments, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high-definition DVD), or other magnetic, optical, or solid state storage devices. In some embodiments, other components, such as universal serial bus or other port connections, compact disc drives, digital versatile disc drives, film recording devices, and the like, may be connected to I/O bridge 107 as well.

In some embodiments, memory bridge 105 can be a Northbridge chip, and I/O bridge 107 can be a Southbridge chip. In addition, communication paths 106 and 113, as well as other communication paths within computing system 100, can be implemented using any technically suitable protocols, including, without limitation, AGP (Accelerated Graphics Port), HyperTransport, or any other bus or point to point communication protocol known in the art.

In some embodiments, parallel processing subsystem 112 comprises a graphics subsystem that delivers pixels to an optional display device 110 that may be any conventional cathode ray tube, liquid crystal display, light-emitting diode display, and/or the like. In such embodiments, parallel processing subsystem 112 may incorporate circuitry optimized for graphics and video processing, including, for example, video output circuitry. Such circuitry may be incorporated across one or more parallel processing units (PPUs), also referred to herein as parallel processors, included within parallel processing subsystem 112.

In some embodiments, parallel processing subsystem 112 incorporates circuitry optimized (e.g., that undergoes optimization) for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 can be configured to perform graphics processing, general purpose processing, and/or compute processing operations. System memory 114 includes at least one device driver configured to manage the processing operations of the one or more PPUs within parallel processing subsystem 112. In addition, system memory 114 includes animation application 126 that enables users to pose 3D objects in XR environments using multiple real and/or virtual hands, as discussed in greater detail below in conjunction with FIGS. 2-13. Although described herein primarily with respect to animation application 126, techniques disclosed herein can also be implemented, either entirely or in part, in other software and/or hardware, such as in parallel processing subsystem 112.

In some embodiments, parallel processing subsystem 112 can be integrated with one or more of the other elements of FIG. 1 to form a single system. For example, parallel processing subsystem 112 can be integrated with processor 142 and other connection circuitry on a single chip to form a system on a chip (SoC).

In some embodiments, processor(s) 102 includes the primary processor of computing system 100, controlling and coordinating operations of other system components. In some embodiments, processor(s) 102 issues commands that control the operation of PPUs. In some embodiments, communication path 113 is a PCI Express link, in which dedicated lanes are allocated to each PPU. Other communication paths may also be used. The PPU advantageously implements a highly parallel processing architecture, and the PPU may be provided with any amount of local parallel processing memory (PP memory).

It will be appreciated that the system 100 shown herein is illustrative and that variations and modifications are possible. The connection topology, including the number and arrangement of bridges, the number of processor(s) 102, and the number of parallel processing subsystems 112, can be modified as desired. For example, in some embodiments, system memory 114 could be connected to processor(s) 102 directly rather than through memory bridge 105, and other devices may communicate with system memory 114 via memory bridge 105 and processor(s) 102. In other embodiments, parallel processing subsystem 112 can be connected to I/O bridge 107 or directly to processor(s) 102, rather than to memory bridge 105. In still other embodiments, I/O bridge 107 and memory bridge 105 may be integrated into a single chip instead of existing as one or more discrete devices. In certain embodiments, one or more components shown in FIG. 1 may not be present. For example, switch 116 could be eliminated, and network adapter 118 and add in cards 120, 121 would connect directly to I/O bridge 107. Lastly, in certain embodiments, one or more components shown in FIG. 1 can be implemented as virtualized resources in a virtual computing environment, such as a cloud computing environment. In particular, parallel processing subsystem 112 can be implemented as a virtualized parallel processing subsystem in some embodiments. For example, parallel processing subsystem 112 can be implemented as a virtual graphics processing unit(s) (vGPU(s)) that renders graphics on a virtual machine(s) (VM(s)) executing on a server machine(s) whose GPU(s) and other physical resources are shared across one or more VMs.

Figure 2:
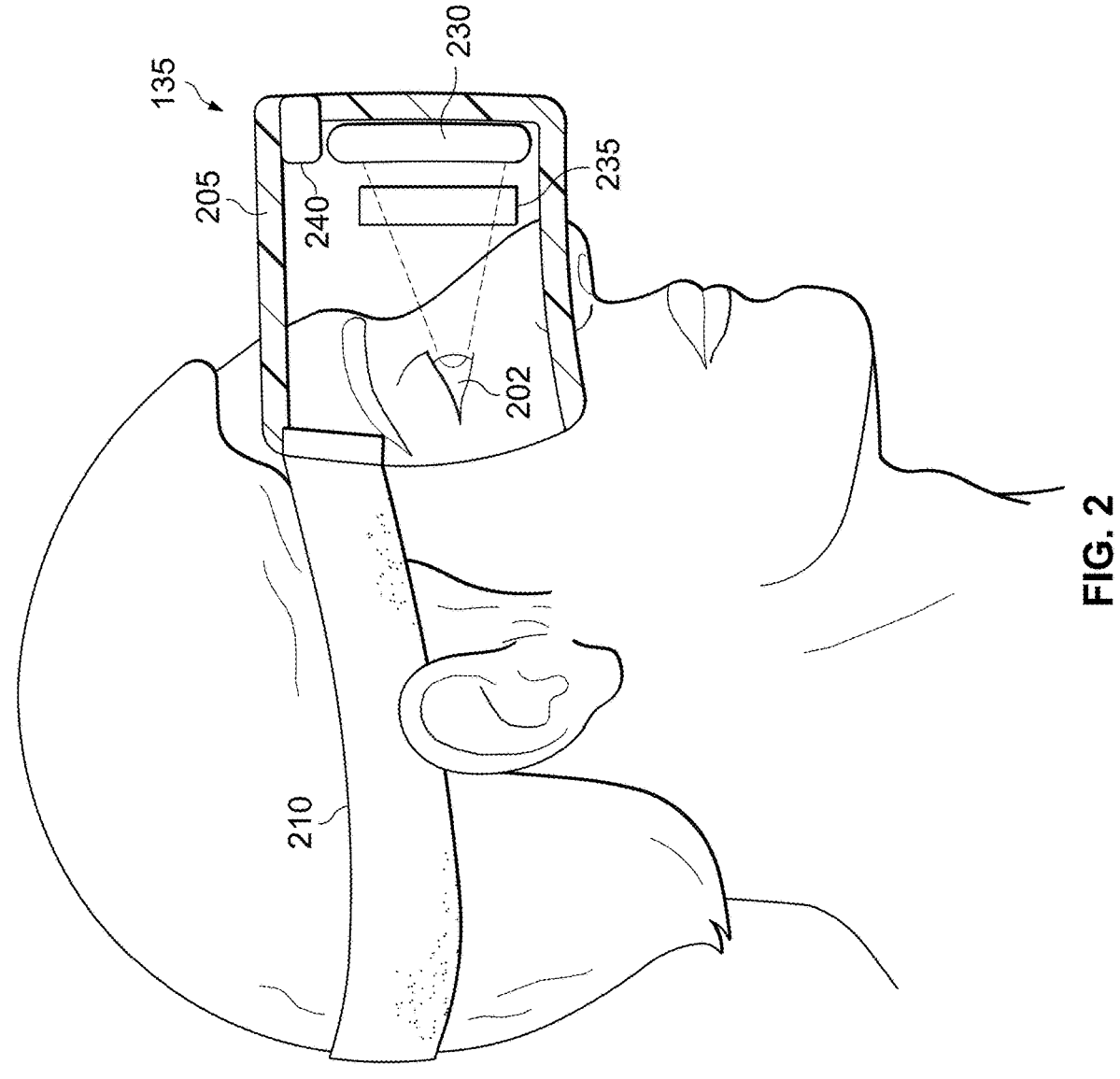
FIG. 2 is a perspective view of the XR headset of FIG. 1, according to various embodiments.

FIG. 2 is a perspective view of the XR headset 135 of FIG. 1, according to various embodiments. As shown in FIG. 2, XR headset 135 includes a body 205 and a head mount 210. Body 205 includes one or more electronic display elements of an electronic display 230. Body 205 also includes a sensor system 240 that acquires sensor data associated with the physical environment external to XR headset 135, which can also be external to any objects (such as computer-assisted devices) in the physical environment. Sensor system 240 can include any technically feasible sensor or sensors, such as monoscopic and stereoscopic optical systems, ultrasonic systems, depth cameras such as cameras using time-of-flight sensors, LIDAR (Light Detection and Ranging) sensors, stereo RGB (red, green, blue) sensors, RGB-D depth-sensors, etc. Although FIG. 2 shows a head-mounted XR headset, other XR systems can be used in other embodiments. Examples of other types of XR systems include appropriately configured tablets, smart-phones, projectors, etc. Although sensor system 240 is shown in FIG. 2 as included in XR headset 135, a sensor system used to provide sensor data associated with the physical environment external to the XR headset 135 (which can also include data external to one or more objects in the physical environment) can be provided in any appropriate location. For example, part or all of such a sensor system can be alternatively or additionally located elsewhere in the physical environment, including mounted on walls, ceilings, or stands, or coupled to a computer-assisted device.

In addition, body 205 includes electronic display 230 and an optics block 235 that together provide image light to a target location of body 205 where an eye 202 of an operator can be positioned. In some examples, body 205 also includes one or more other sensors, such as one or more imaging devices (e.g., one or more imaging sensors for tracking eye 202), accelerometers, and/or angular velocity sensors (which can be part of inertial measurement units (IMUs)), position sensors, and/or other sensors.

Electronic display 230 is configured to display images viewable by the operator. In various embodiments, electronic display 230 includes a single electronic display or multiple electronic displays (e.g., a display for each eye of an operator). Examples of the electronic display 230 include: a liquid crystal display (LCD), an organic light emitting diode (OLED) display, an active-matrix organic light-emitting diode display (AMOLED), a QOLED, a QLED, some other display, or some combination thereof. Optics block 235 includes optical elements that can be used to adjust an orientation of image light emitted from electronic display 230 such that electronic display 230 appears at particular virtual image distances from the operator.

In some embodiments, XR headset 135 operates as an augmented reality (AR) device that presents computer-generated media to an operator using electronic display 230 that augments views of a physical, real-world environment visible to the operator through electronic display 230. Examples of computer-generated media presented by XR headset 135 include one or more images, video, audio, or some combination thereof. Alternatively or additionally, in some embodiments, XR headset 135 operates as a VR device, or some combination of an AR device and a VR device, such as a device that permits switching between AR and VR environments. As described, AR content provides an AR environment in which physical objects and computer-generated elements can interact, and VR content provides a virtual environment that includes computer-generated elements. In the case of a VR device, sensor system 240 can capture images of the physical environment and display the captured images along with computer-generated elements, such as AR content, which is also sometimes referred to as video see through. Examples of commercially available AR devices include Microsoft HoloLens®, Google Glass®, and Meta 2®. Examples of commercially available MR devices include Microsoft HoloLens 2®, Samsung Odyssey+®, HP Reverb®, and Oculus Quest 2®. Examples of commercially available XR devices include Oculus Rift®, Samsung Gear VR®, HTC Vive®, and Google Daydream View®.

It should be noted that FIG. 2 merely shows XR headset 135 as an example configuration of a XR system. In some embodiments, the techniques disclosed herein are usable with other configurations and/or types of XR systems. The other configurations and/or types of XR systems include head-mounted XR systems, hand-held XR systems, and XR systems that are placed in the environment, among other things. Examples of alternative configurations and/or types of XR systems include optical head-mounted displays (HMDs), mobile devices (e.g., mobile phones, tablet computers, etc.), fully immersive projection systems, etc.

Figure 3:
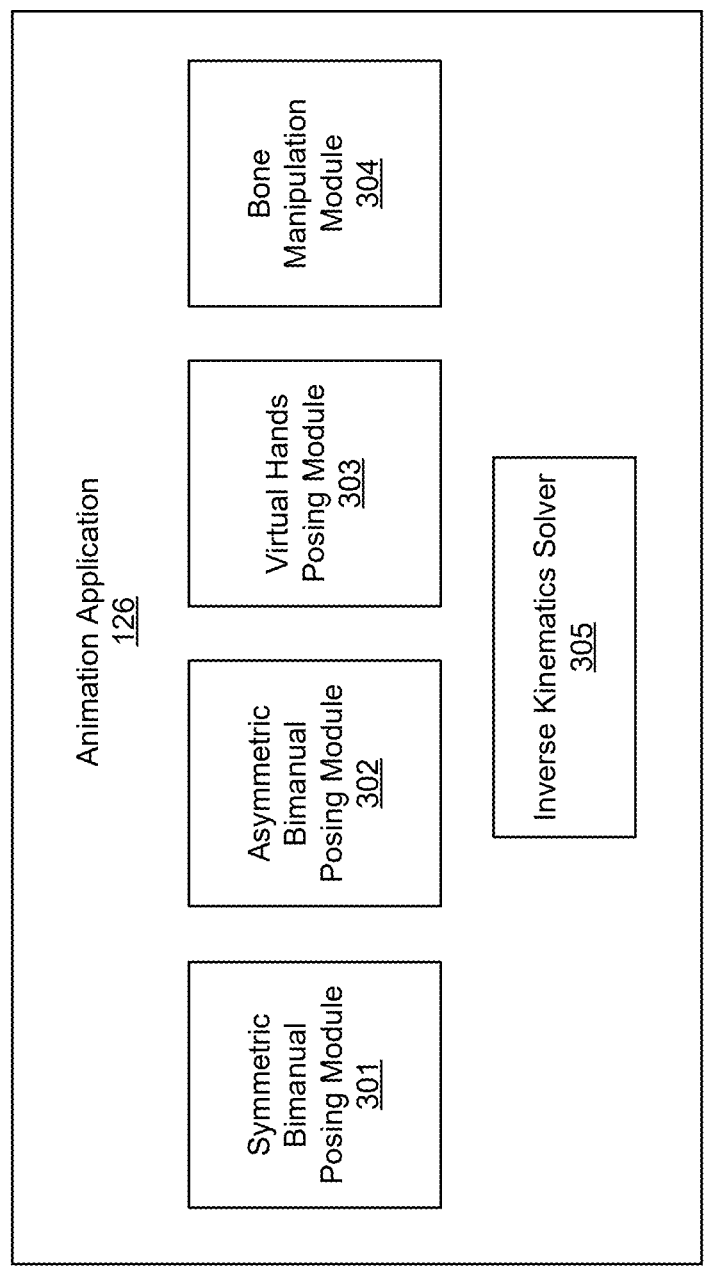
FIG. 3 is a more detailed illustration of the animation application of FIG. 1, according to various embodiments.

Manipulating Three-Dimensional Objects Using Multiple Hands in Virtual Reality Environments FIG. 3 is a more detailed illustration of the animation application 126 of FIG. 1, according to various embodiments. As shown, animation application 126 includes a symmetric bimanual posing module 301, an asymmetric bimanual posing module 302, a virtual hands posing module 303, a bone manipulation module 304, and an inverse kinematics solver 305. In operation, animation application 126 processes interactions of user 134 within an XR environment, and animation application 126 determines a posing mode, which can be a symmetric bimanual, asymmetric bimanual, virtual hands, and/or bone manipulation mode. In some embodiments, when user 134 performs interactions such as pinching, grabbing, expansive movements, and/or the like, animation application 126 assesses the movements against predefined user interaction patterns to determine a corresponding posing mode. In some embodiments, in animation application 126, a virtual 3D object, such as a 3D character and/or the like, is modeled using an inverse kinematic (IK) hierarchical tree data structure (also referred to herein as a "hierarchical tree model" or a "hierarchical tree") in which joints (also sometimes referred to as "effectors") associated with the 3D object are stored in nodes of the tree and the limbs or body parts of the 3D object are represented by connecting links or edges between nodes. For example, the tree data structure can be used to represent the anatomy of a 3D character, mirroring the skeletal framework of a biological entity. Each joint serves as a pivot point for movement, with the bones that stretch between joints defining the possible range and angle of motion. The hierarchical tree model can be used to determine the kinematics of the 3D object, as the hierarchical tree model indicates how each part of the 3D object is interconnected and how movement can propagate through a hierarchy of parts of the 3D object. Although described herein primarily with respect to virtual 3D objects as a reference example, in some embodiments, techniques disclosed herein can be used to pose any suitable objects, such as physical robots.

Symmetric bimanual posing module 301 facilitates the creation of symmetrical poses in 3D objects, such as a 3D character, and/or the like, by allowing simultaneous manipulation of any two distinct joints. Symmetric bimanual posing module 301 enables user 134 to use both hands in an XR environment to pose a 3D object, mirroring the way humans often use both hands in tandem to conduct tasks in the real world. For example, user 134 could adjust the left and right knees of a 3D character at the same time to create a kneeling pose or move both arms upwards to form a T-pose, ensuring that both sides of the body are moving in harmony. In various embodiments, symmetric bimanual posing module 301 is not restricted to mirroring joints; user 134 can also choose to raise one hand of the character while lowering the other, enabling dynamic posing beyond perfect symmetry. In at least one embodiment, symmetric bimanual posing module 301 can be used to create poses that require equal action on both sides of a 3D character, including poses found in activities such as jumping, lifting, performing various athletic stances, and/or the like.

Asymmetric bimanual posing module 302 is designed to facilitate naturally asymmetrical hand movements, where each hand performs a distinct role in manipulating a 3D object. In various embodiments, asymmetric bimanual posing module 302 allows user 134 to employ a predefined gesture, such as a palm grip gesture, with the non-dominant hand to hold a reference point on the 3D object steady, akin to how one can hold a piece of paper still with one hand while writing with the other. The dominant hand, using another predefined gesture such as a pinch gesture, is then free to manipulate other joints of the 3D objects. For example, when user 134 affixes the right hand joint of a character using a palm grip, the right hand joint is held in place, and the left hand can then be used to adjust the position of the elbow, shoulder, or even the opposite limb, thus altering the pose of the 3D character. In some embodiments, user 134 can control the strength of the hold on the joint, allowing for subtle nuances in the fixation, where a less firm grip can, for example, let a hand of a 3D character drift slightly from a held position, adding a natural dynamic to a 3D animation.

Virtual hands posing module 303 enhances the 3D posing process by simulating the concept of lending a hand, similar to collaborative efforts seen in assembly tasks. Virtual hands posing module 303 allows users to hold a joint of a 3D object in place by creating a virtual hand. In some embodiments, a predefined user interaction, such as pressing a designated button, causes the position and orientation of a hand of user 134 to be recorded, and upon retraction of the physical hand of user 134, a virtual hand remains at the recorded position and orientation. The virtual hand effectively fixes the joint, maintaining the position of the joint within the XR environment. In various embodiments, user 134 can use virtual hands posing module 303 to manage complex poses, where one part of a 3D object has to remain stationary while other parts are being adjusted. For example, user 134 can fix the feet of a 3D character in a walking pose, simulating ground contact, while using his or her real hands to articulate the swing of the arms or the twist of the torso. In various embodiments, user 134 can create multiple virtual hands, each with varying degrees of holding strength that affect whether joints are fixed in place or have some degree of movement, providing precise control over the rigidity or flexibility of the joint positions. For example, in some embodiments, the holding strength can be implementing using a weight that varies between 0 and 1 depending on the user interaction (e.g., how much user 134 presses a button), and the weights for joints can be input into inverse kinematics solver 305, described in greater detail below, for use in an inverse kinematics computation to update joint positions in response to another user interaction.

In some embodiments, user 134 can undo or adjust virtual hands, for example, by interacting with the joint—again (e.g., using a predefined interaction). Although described herein primarily with respect to fixing joints in a single location and orientation, in some embodiments, virtual hands can be recorded that fix joints in different locations and/or orientations across a number of video frames, and the recorded virtual hands can be synchronized with user hand interactions using, for example, a timeline. Although described herein primarily with respect to virtual hands that fix joints in place with respect to global coordinate frame, in some embodiments, virtual hands can be used as "clothespins" that clip an object onto a joint by fixing the joint in a coordinate frame associated with the object, thereby supporting poses in which a joint is in contact with an object such as drinking out of a can or playing music with a guitar attached to the hands of a 3D character.

Bone manipulation module 304 allows direct interaction with the links of the 3D object, such as the bones associated with a 3D character. In some embodiments, bones are conceptualized not merely as rigid anatomical structures but as segments that facilitate movement, with each segment defined by the joints to which the segment is connected. In various embodiments, user 134 interacts with a bone by selecting a corresponding bounding box within the XR environment, which then enables user 134 to move the associated joints, with the manipulation of the bone bounding box being translated by bone manipulation module 304 into the movements of the associated joints based on the relative positions of the associated joints to a selected position on the bone. In such cases, bone manipulation module 304 first records the local positions and rotation of each joint connected to a bone and attaches each joint as a child of the bone in the hierarchical tree or another data structure. Then, when the bone represented by a primitive, such as a bounding box, is moved by user 134, the associated joints that are connected to the bone move along with the bone and, bone manipulation module 304 tracks the position and rotation changes to set new values to the associated joints. In some embodiments, each bone can be categorized based on the number of joints the bone connects, including but not limited to, singular-link bones such as bones in the hands or feet that are connected to one joint, binary-link bones such as forearm or upper leg bones that are connected to two, and ternary-link bones such as chest or abdomen bones that are connect to three joints. The hierarchical tree allows user 134 to apply movements that are anatomically accurate and kinematically complex. For example, when user 134 moves a binary-link bone, both the proximal and distal joints-such as the elbow and hand joints in the case of a forearm-respond accordingly. In some embodiments, bone manipulation module 304 permits users to use both hands symmetrically or asymmetrically to grab and move bones, similar to the description above in conjunction with symmetric bimanual posing module 301 and asymmetric bimanual posing module 302. In some embodiments, bone manipulation module 304 allows virtual hands. Virtual hands can be placed by user 134 to hold a bone stationary at a desired position in space. In at least one embodiment, bone manipulation module 304 allows for asymmetrical manipulation, where user 134 can use one hand to hold a bone while moving other bone(s) and/or joints with the other hand, similar to the description above in conjunction with asymmetric bimanual posing module 302.

Inverse kinematics solver 305 is a computational engine that computes the angles and positions of joints to achieve a desired pose of a 3D object. Inverse kinematics solver 305 uses the tree data structure associated with the 3D object, where each joint is stored in a node and the connecting edges or links represent bones. Inverse kinematics solver 305 operates on the principle of inverse kinematics, a technique used to determine the joint configurations needed for the end effector (e.g., hand or foot of a 3D character) to reach a target position and orientation. User 134 manipulates the 3D object to a desired pose, and inverse kinematics solver 305 computes the angles of all the joints to achieve the desired pose. For example, when user 134 positions the hand of a 3D character to touch an object, inverse kinematics solver 305 determines how to move the shoulder, elbow, and hand joints to place the hand at that specific point in space, by carrying out mathematical calculations that consider the lengths of the bones, the range of motion of the joints, and the constraints of the 3D character anatomy. Inverse kinematics solver 305 supports the different modules within animation application 126 in various ways. For example, when using the bone manipulation module 304, inverse kinematics solver 305 ensures that when user 134 manipulates a bone, not only does the selected bone move, but all connected joints are also appropriately rotated and positioned. When using asymmetric bimanual posing module 302, inverse kinematics solver 305 computes the movement of the active joints in relation to the fixed joints. Additionally, virtual hands posing module 303, which allows for the temporary fixation of joints, uses inverse kinematics solver 305 to compute how the rest of the object should move in response to the fixed positions, as discussed in greater detail below.

Figure 4:
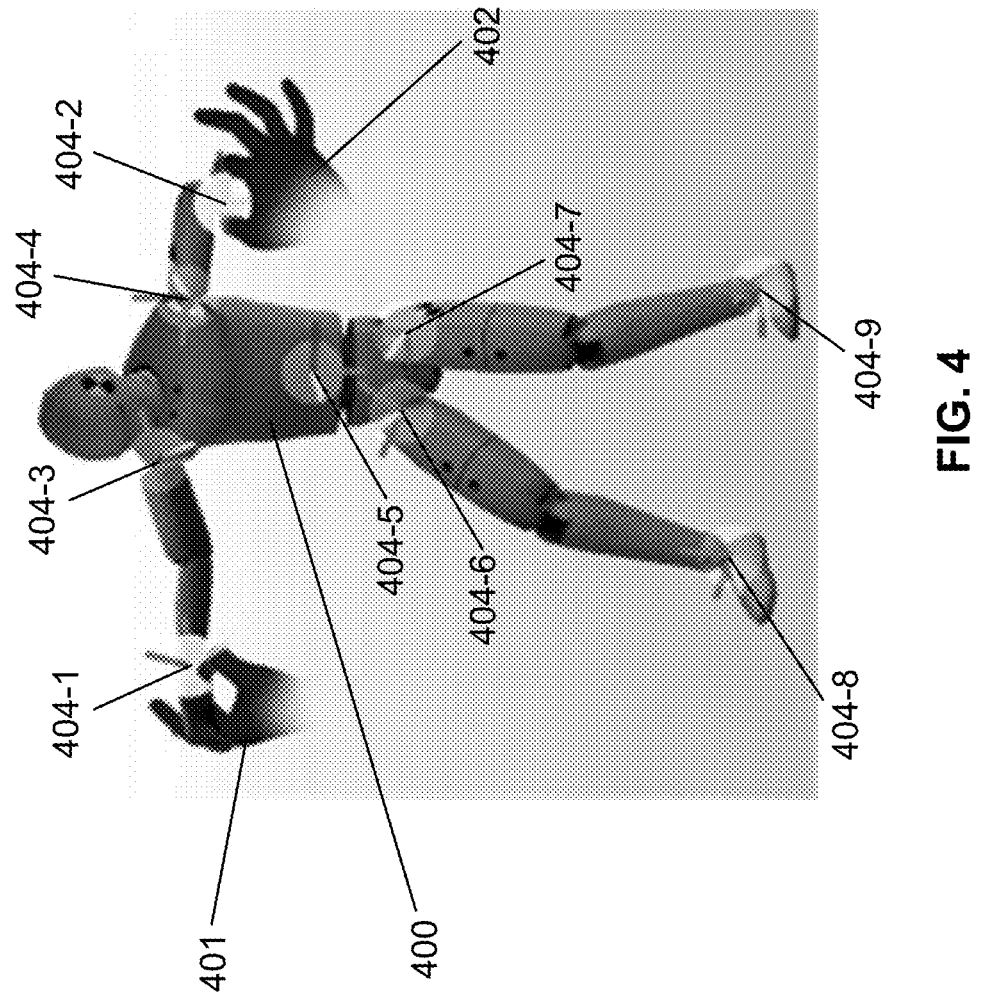
FIG. 4 illustrates an exemplar manipulation of a 3D object using the symmetric bimanual posing module of FIG. 3, according to various embodiments.

FIG. 4 illustrates an exemplar manipulation of a 3D object using symmetric bimanual posing module 301 of FIG. 3, according to various embodiments. As shown, user 134 has positioned a left hand 401 and a right hand 402 to symmetrically manipulate corresponding joints 404-1 and 404-2 on a 3D character 400. Symmetric bimanual posing module 301 adjusts the 3D character pose based on the simultaneous hand movements of user 134. In some embodiments, symmetric bimanual posing module 301 uses inverse kinematics solver 305 to compute the translations and/or rotations of joints 404-3 to 404-9 required to effectuate the hand movements of user 134. For example, inverse kinematics solver 305 could compute, as user 134 manipulates the hands of 3D character 400, how shoulder joints 404-3 and 404-4 pivot and rotate to maintain the anatomical plausibility and physical constraints of 3D character 400.

Figure 5:
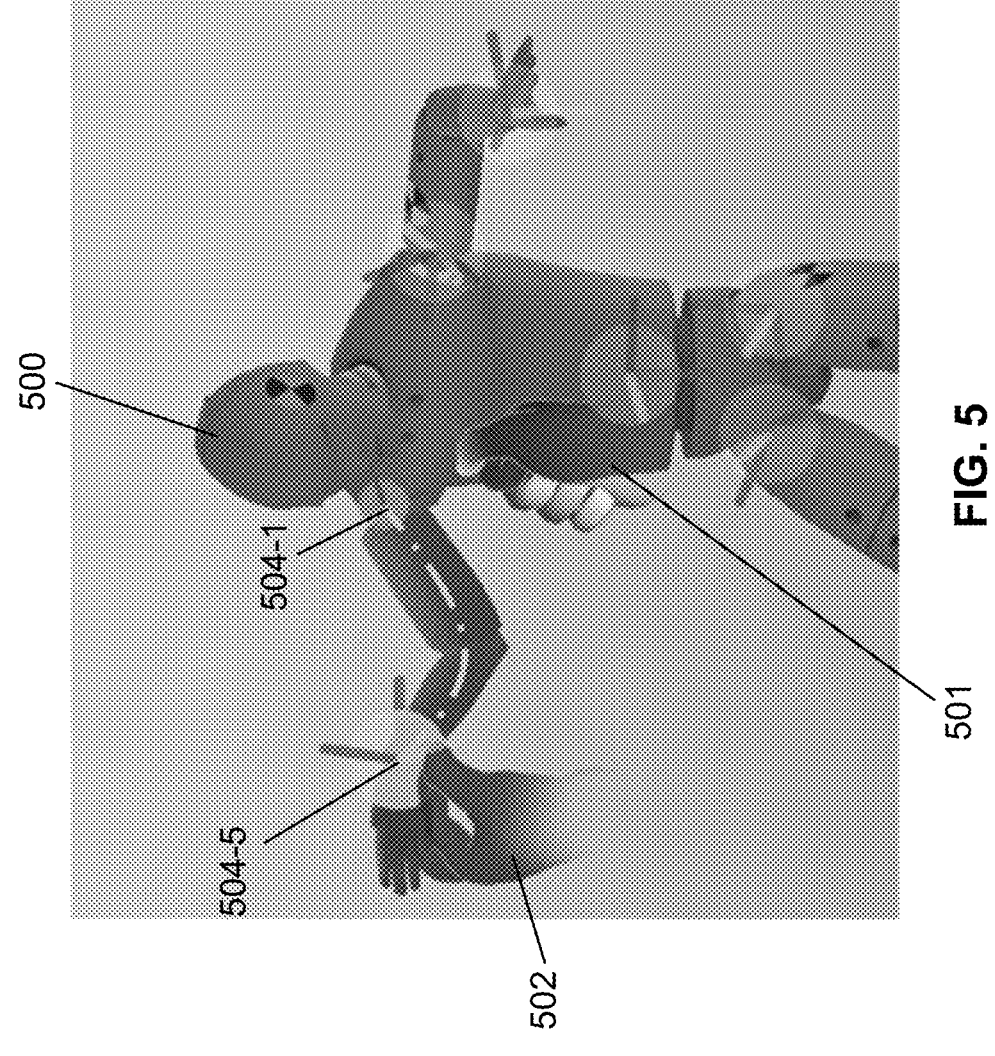
FIG. 5 illustrates an exemplar manipulation of a 3D object using the asymmetric bimanual posing module of FIG. 3, according to various embodiments.

FIG. 5 illustrates an exemplar manipulation of a 3D object using asymmetric bimanual posing module 303 of FIG. 3, according to various embodiments. As shown, user 134 uses right hand 501 to fix right shoulder joint 504-1 of 3D character 500, while left hand 502 is used to manipulate right hand joint 504-5. Given such user interactions, asymmetric bimanual posing module 303 uses inverse kinematics solver 305 to compute adjustments to the pose of 3D character 500 caused by the user interactions. While the right hand 501 affixes one joint position, creating a static reference point at right shoulder joint 504-1, the left hand 502 actively repositions the right arm of 3D character 500, influencing joints in the right arm. Inverse kinematics solver 305 dynamically evaluates the position of the fixed right shoulder joint 504-1 and computes the movement trajectory for the active joints, ensuring that the resulting pose is coherent and maintains anatomical integrity of 3D character 500 based on the hierarchical tree.

Figure 6:
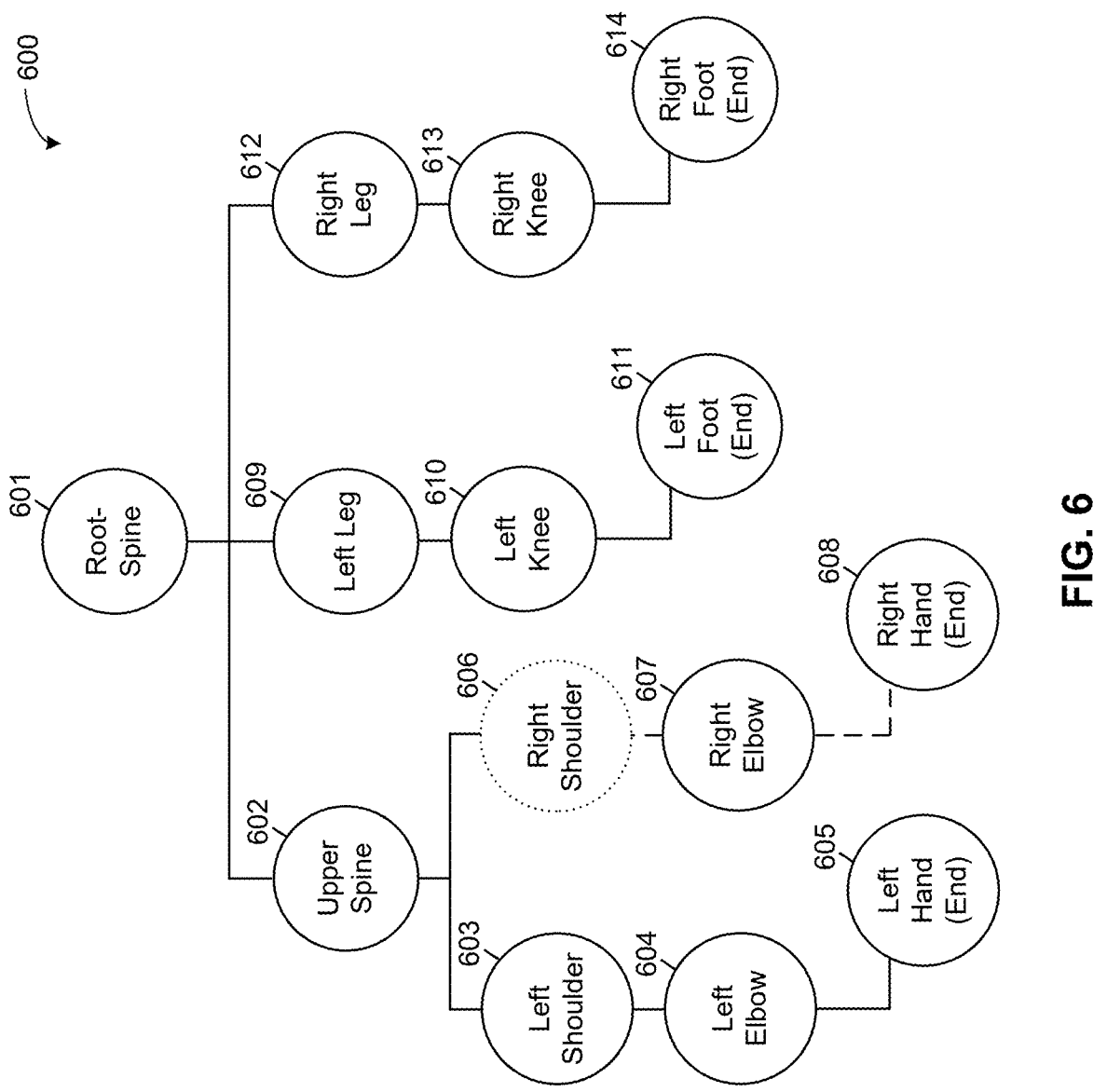
FIG. 6 illustrates an exemplar inverse kinematics chain that is affected by the asymmetric bimanual manipulation of FIG. 5, according to various embodiments.

FIG. 6 illustrates an exemplar inverse kinematics chain that is affected by the asymmetric bimanual manipulation of FIG. 5, according to various embodiments. As shown, an IK hierarchical tree data structure 600 for 3D character 500, described above in conjunction with FIG. 5, includes nodes 601-614 that store joints associated with 3D character 500. Illustratively, when right shoulder joint 504-1 stored in node 606 is fixed, descendant joints of right shoulder joint 504-1 in tree data structure 600, shown as a right elbow joint stored in node 607 and a right hand joint stored in node 608, can be manipulated relative to right shoulder joint 504-1. The relationship between the fixed jointed and a manipulated joint determines the inverse kinematics chain that will be affected by the manipulation. Returning to the above example in which left hand 502 of user 134 manipulates right hand joint 504-5 while right hand 501 of user 134 fixes right shoulder joint 504-1, changes are computed by inverse kinematics solver 305 for only the right arm chain that includes the right elbow joint and the right hand joint, while the rest of the body of 3D character 500 remains unchanged. Accordingly, the holding right hand 501 serves as a spatial reference to the manipulation left hand 502.

Figure 7:
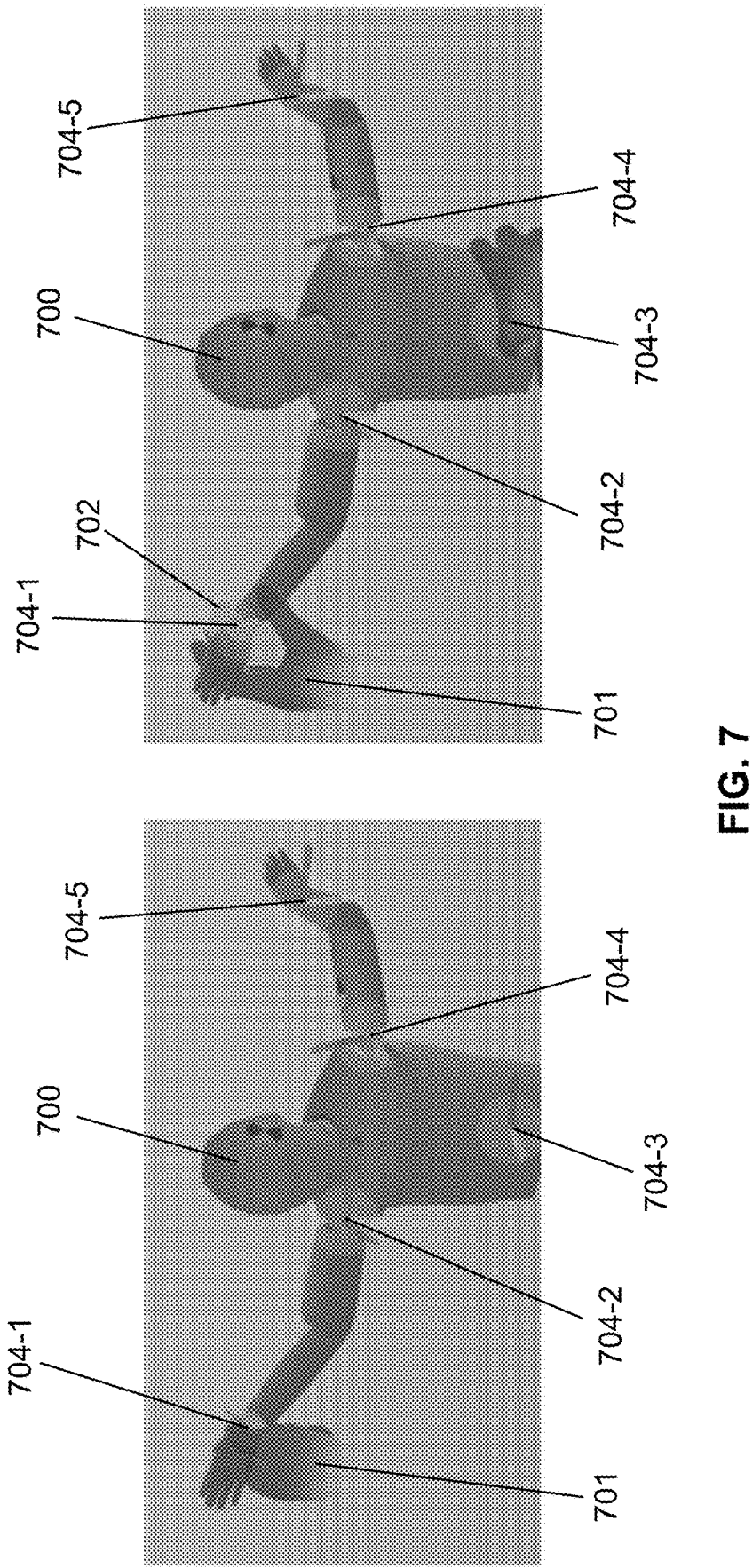
FIG. 7 illustrates an exemplar manipulation of a 3D object using the virtual hands posing module of FIG. 3, according to various embodiments.

FIG. 7 illustrates an exemplar manipulation of a 3D object using virtual hands posing module 303 of FIG. 3, according to various embodiments. As shown, user 134 uses a left hand 701 to place a virtual hand 702 to fix right hand joint 704-1 of 3D character 700. After placing virtual hand 702, the left hand 701 of user 134 is free to manipulate other joints, such as root spine joint 704-3, without altering the fixed pose of right hand joint 704-1. Virtual hands module 303 processes the virtual hand manipulations. In some embodiments, virtual hands module 303 uses inverse kinematics solver 305 to compute the joint translations and/or rotations for other joints (e.g., joints 704-2 to 704-5) in a hierarchical tree data structure associated with 3D character 700. For example, inverse kinematics solver could compute joint translations and/or rotations for descendant joints of joint(s) that are fixed by hand(s) of user 134 and/or virtual hands, similar to the description above in conjunction with FIG. 6.

Figure 8:
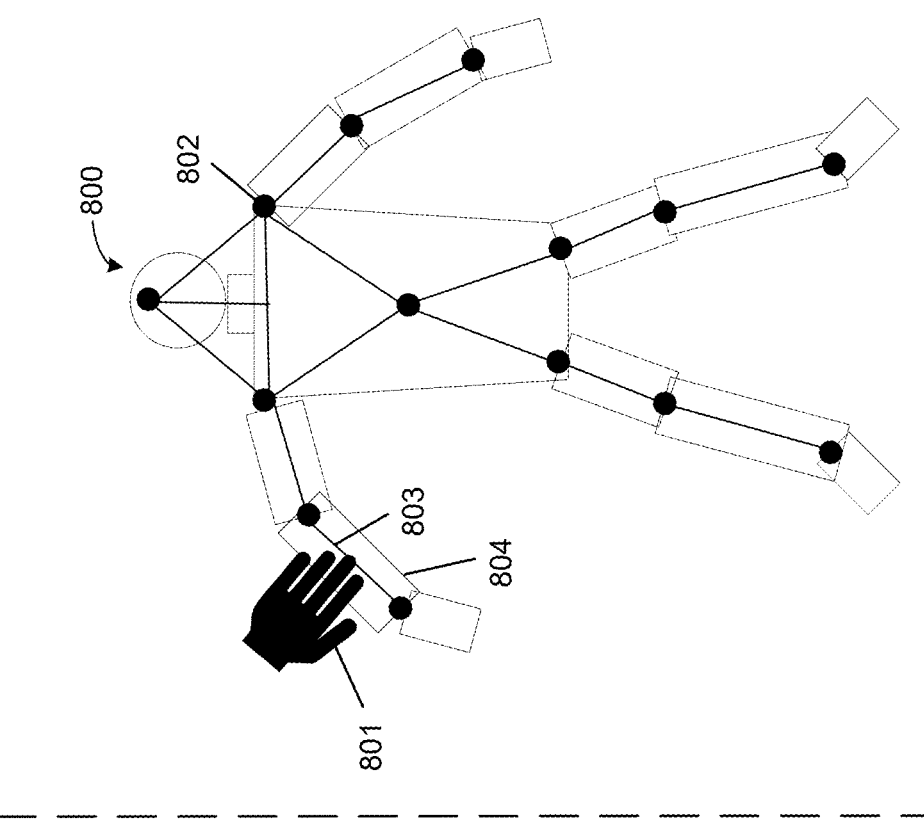
FIG. 8 illustrates an exemplar manipulation of a 3D object using the bone manipulation module of FIG. 3, according to various embodiments.
Figure 8:
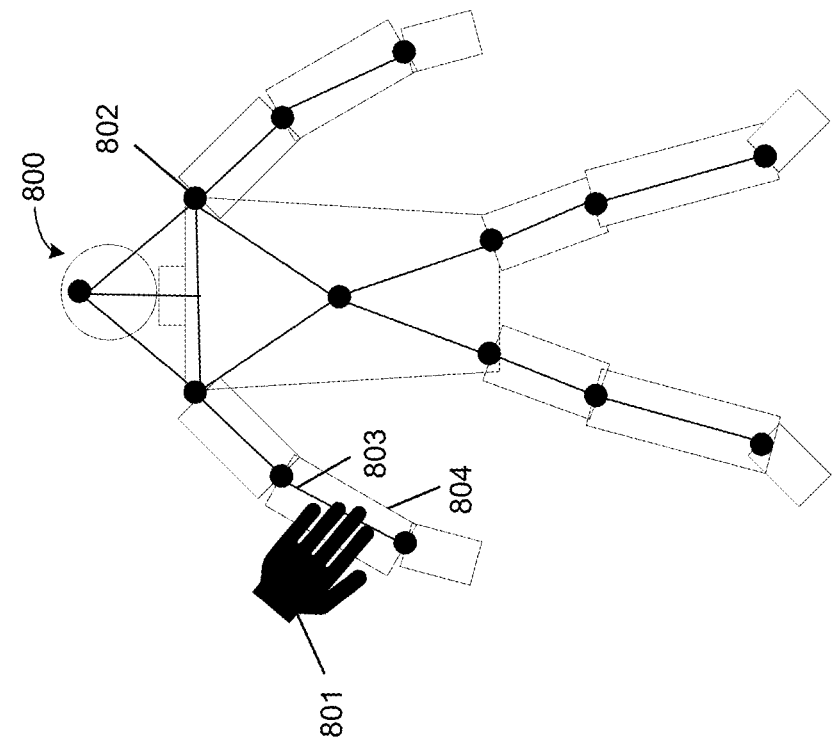

FIG. 8 illustrates an exemplar manipulation of a 3D object using bone manipulation module 304 of FIG. 3, according to various embodiments. As shown, user 134 uses one hand 801 to move a bone 803. A hierarchical tree data structure associated with 3D character 800 is structured as a series of links and nodes, with the links representing bones and nodes storing joints of 3D character 800, similar to the description above in conjunction with FIG. 6. User 134 selects and manipulates bone 803 by grabbing and moving a corresponding bounding box 804 within an XR environment. Bone manipulation module 304 translates the movements of user 134 into the corresponding joint movements of 3D character 800. When user 134 moves bone 804, bone manipulation module 304 uses inverse kinematics solver 305 to compute adjustments to the elbow and hand joints that are connected to bone 804, as well as to other joints that are affected by the movement of the elbow and hand joints.

Figure 9:
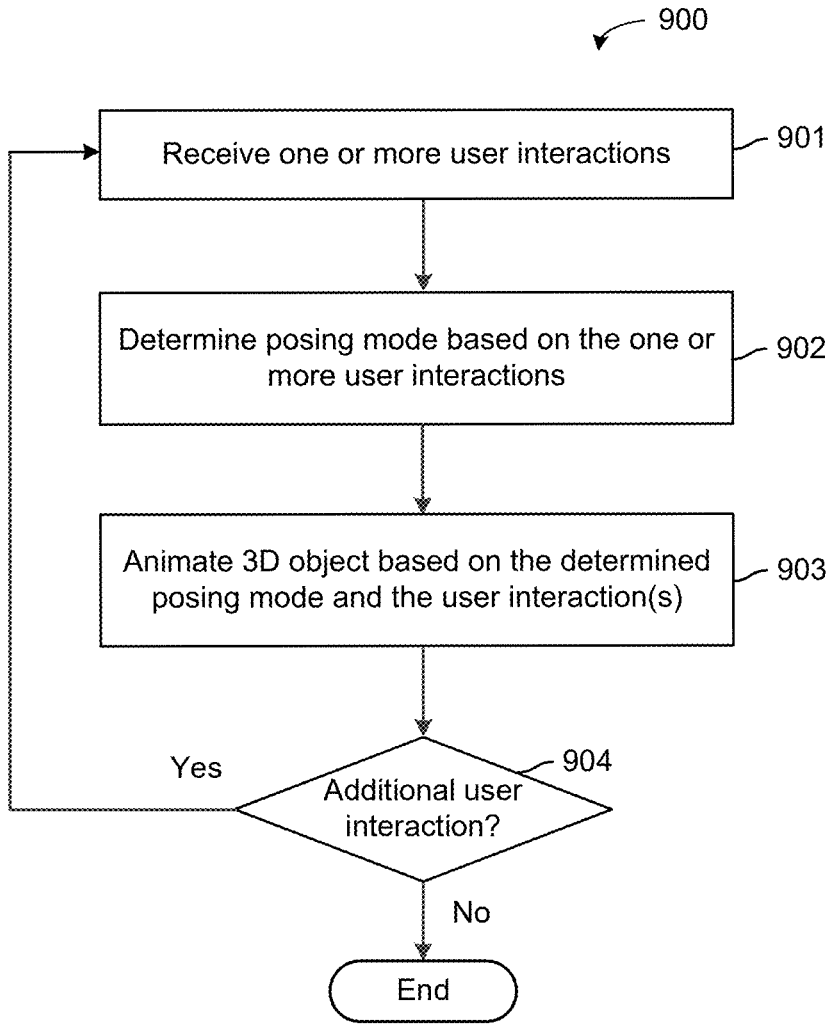
FIG. 9 is a flow diagram of method steps for manipulating a 3D object, according to various embodiments.

FIG. 9 is a flow diagram of method steps for manipulating a 3D object, according to various embodiments. Although the method steps are described in conjunction with the systems of FIGS. 1-3, persons skilled in the art will understand that any system configured to perform the method steps, in any order, falls within the scope of the present invention.

As shown, a method 900 begins with step 901, where animation application 126 receives one or more user interactions. In some embodiments, the user interaction(s) can be captured by hand sensor(s) 136, which can be part of or connected to XR headset 135 worn by user 134. Hand sensor(s) 136 monitor a variety of hand actions performed by user 134, such as pinching, grabbing, waving, and/or the like, and are capable of translating the physical gestures into commands within the virtual environment. The data captured from the hand movements are transmitted via a communication path 106 to processor(s) 102 and then processed by animation application 126. Animation application 126 can process any technically feasible sensor data, including but not limited to, data acquired using optical sensors, infrared sensors, gyroscopes, accelerometers, capacitive sensors, and/or the like. XR headset 135, equipped with an electronic display 230 and an optics block 235, provides user 134 with visual feedback, rendering the images for immersive XR experiences. In various embodiments, the images can range from computer-generated media to a mixture of real-world and augmented views, depending on whether the headset operates in VR or AR modes.

At step 902, animation application 126 determines a posing mode based on the one or more user interactions. When user 134 performs gestures such as pinching, grabbing, expansive movements, and/or the like, animation application 126 assesses the movements against predefined interaction patterns to select the corresponding posing mode, which could be any among symmetric bimanual, asymmetric bimanual, virtual hands, or bone manipulation modes, described above in conjunction with FIGS. 3-8. For example, if the interactions of user 134 include symmetrical movements, such as moving both hands apart or together in a coordinated fashion and/or the like, animation application 126 can determine a symmetric bimanual posing mode. Conversely, if the interactions of user 134 suggest an intention to stabilize one part of the 3D object while adjusting another, animation application 126 could determine the asymmetric bimanual posing mode. For interactions where user 134 appears to hold a position in space using a predefined gesture, potentially to set a joint or limb in a fixed orientation, animation application 126 could determine the virtual hands posing mode. If the interactions of user 134 indicate the manipulation of a limb or section of the 3D object, the bone manipulation mode can be determined. Although described herein primarily with respect to determining a single posing mode for simplicity, in some embodiments, multiple posing modes, such as virtual hands with bone manipulation, can be determined simultaneously.

At step 903, animation application 126 poses the 3D object based on the determined posing mode and the received user interaction(s). If animation application 126 determines the symmetric bimanual posing mode, symmetric bimanual posing module 301 is used to process the user interaction(s) as described in greater detail below in conjunction with FIG. 10. If animation application 126 determines the asymmetric bimanual posing mode, asymmetric bimanual posing module 302 is used to process the user interaction(s) as described in greater detail below in conjunction with FIG. 11. If animation application 126 determines the virtual hands posing mode, virtual hands posing module 303 is used to process the user interaction(s) as described in greater detail below in conjunction with FIG. 12. If animation application 126 determines the bone manipulation mode, bone manipulation module 304 is used to process the user interaction(s) as described in greater detail below in conjunction with FIG. 13.

At step 904, animation application 126 checks whether there are additional user interactions. If there are additional user interactions, then method 900 returns to step 901, where animation application 126 receives one or more additional user interactions. If there are no additional user interactions, method 900 ends.

Figure 10:
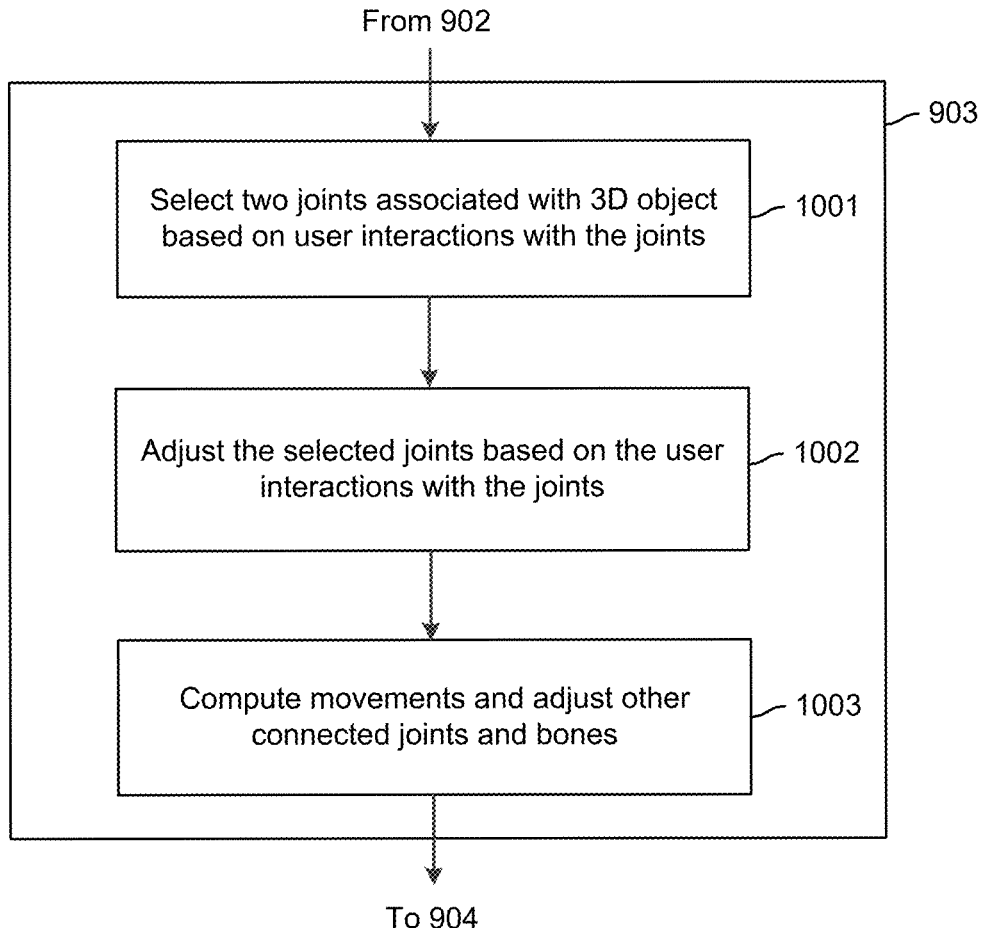
FIG. 10 is a flow diagram of method steps for manipulating a 3D object based on a symmetric bimanual posing mode in the method of FIG. 9, according to various embodiments.

FIG. 10 is a flow diagram of method steps for manipulating a 3D object based on a symmetric bimanual posing mode in step 903 of method 900, according to various embodiments. Although the method steps are described in conjunction with the systems of FIGS. 1-3, persons skilled in the art will understand that any system configured to perform the method steps, in any order, falls within the scope of the present invention.

As shown, at step 1001, symmetric bimanual posing module 301 selects two joints associated with a 3D object based on user interactions with the two joints. Symmetric bimanual posing module 301 streamlines the creation of symmetrical poses within 3D objects, such as 3D characters, by allowing user 134 to manipulate two distinct joints simultaneously. Symmetric bimanual posing module 301 enables user 134 to use both hands within an XR environment to pose the 3D object in a manner that reflects natural bimanual coordination, akin to performing tasks in the real world. For example, user 134 can simultaneously adjust the left and right knees of a 3D character to create a kneeling pose or raise both arms to form a T-pose, ensuring synchronized movement on both sides of the 3D character body. In various embodiments, symmetric bimanual posing module 301 is not limited to user interactions that mirror each other exactly. User 134 has the flexibility to raise one joint of the character while lowering the opposite joint, enabling the creation of dynamic and varied poses. In some embodiments, symmetric bimanual posing module 301 permits user manipulation of a 3D character into poses that require consistent actions across both sides of a body of the 3D character, such as poses typical in jumping, lifting, executing various athletic movements, and/or the like.

At step 1002, symmetric bimanual posing module 301 adjusts the selected joints based on the user interactions with the joints.

At step 1003, inverse kinematics solver 305 computes movements and adjusts other connected joints and bones. Once symmetric bimanual posing module 301 has determined which joints user 134 is manipulating, symmetric bimanual posing module 301 uses inverse kinematics solver 305 to compute the adjustments to the rest of the 3D character body, which ensures that the movements of the directly manipulated joints result in a natural and cohesive motion throughout the entire structure of the 3D character, respecting the hierarchical tree that defines the 3D character anatomy. Inverse kinematics solver 305 uses the principles of inverse kinematics to propagate user-induced movements across the 3D character joints in a manner that maintains symmetry and balance. For example, if user 134 raises both arms of the character, inverse kinematics solver 305 could compute how the shoulders, elbows, and hands should be rotated and repositioned to achieve the desired pose given the user interactions.

Figure 11:
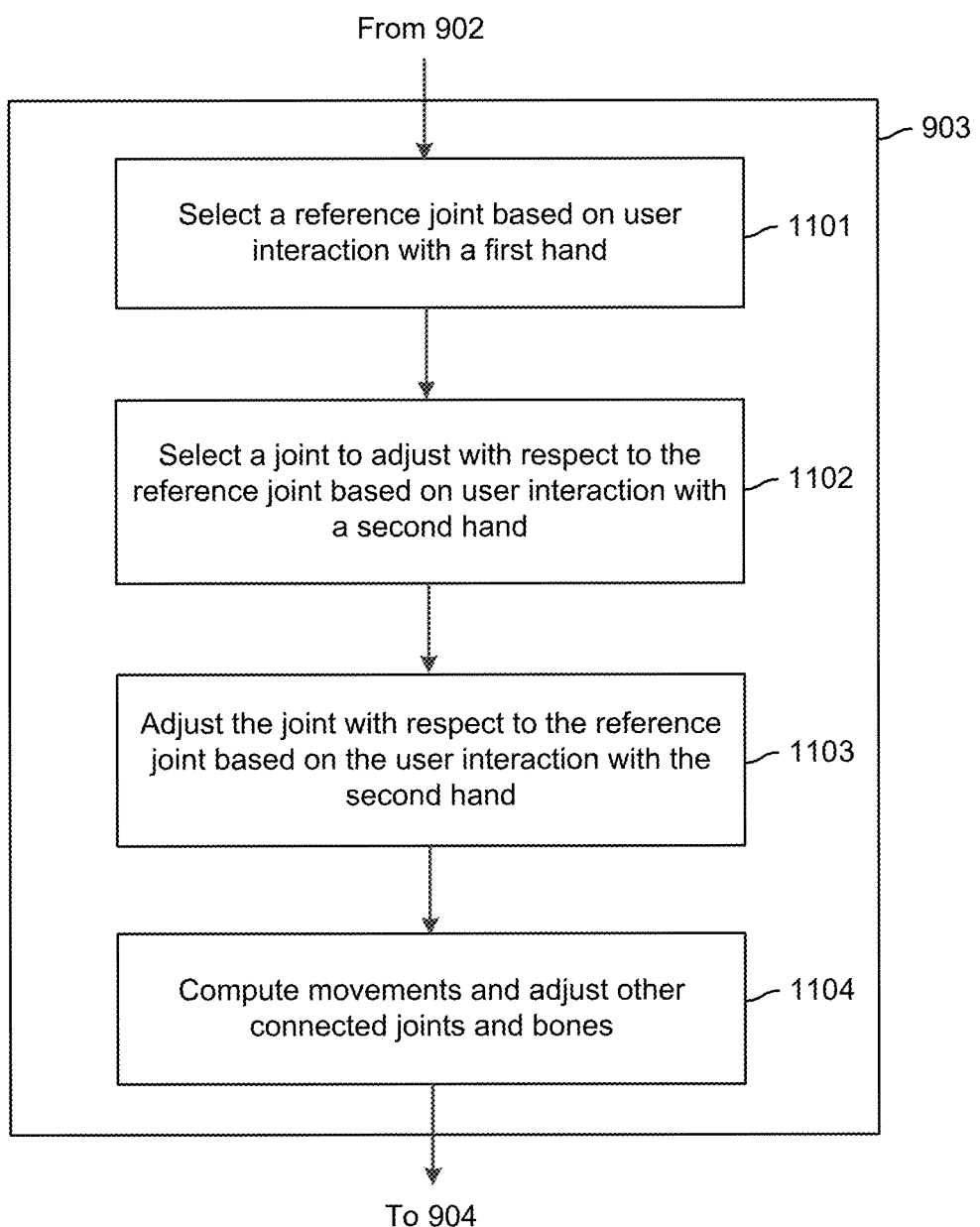
FIG. 11 is a flow diagram of method steps for manipulating a 3D object based on a asymmetric bimanual posing mode in the method of FIG. 9, according to various embodiments.

FIG. 11 is a flow diagram of method steps for manipulating a 3D object based on an asymmetric bimanual posing mode in step 903 of method 900, according to various embodiments. Although the method steps are described in conjunction with the systems of FIGS. 1-3, persons skilled in the art will understand that any system configured to perform the method steps, in any order, falls within the scope of the present invention.

As shown, at step 1101, asymmetric bimanual posing module 302 selects a reference joint based on a user interaction with a first hand. Asymmetric bimanual posing module 302 enables user 134 to use a predefined interaction, such as a palm grip gesture with the non-dominant hand to establish a reference point on the 3D object (e.g., holding a joint of a 3D character steady), much like one would hold a piece of paper in place. The reference joint then acts as a pivot or anchor, around which other joints can be manipulated. In some embodiments, asymmetric bimanual posing module 302 also determines, based on the user interaction with the first hand, a strength of the hold that affects whether the joint is fixed in place or is allowed to have some degree of movement.

At step 1102, asymmetric bimanual posing module 302 selects a joint to adjust with respect to the reference joint based on a user interaction with a second hand. The second hand could, for example, be engaging in a pinch gesture and adjusting other joint(s) of the 3D object. For example, user 134 could affix the right hand of a 3D character in a fixed position using the palm grip of one hand and then use another hand to modify the pose of the elbow or shoulder joints, effectively changing the overall stance of the 3D character.

At step 1103, asymmetric bimanual posing module 302 adjusts the joint with respect to the reference joint based on the user interaction with the second hand. Once a reference point is established by the first hand interactions at step 1101 and the second hand movements to manipulate another joint is processed at step 1102, asymmetric bimanual posing module 302 adjusts the position and/or orientation of the other joint in relation to the reference joint. Asymmetric bimanual posing module 302 enables user 134 to achieve a high degree of control over the 3D object pose, facilitating complex adjustments where one part of the 3D object remains stationary while other parts move. The adjustment process in asymmetric bimanual posing module 302 considers the hierarchical tree connecting the reference joint and the joint being manipulated, ensuring that movements are realistic and adhere to the anatomical constraints of the 3D object. For example, if the reference joint is the hip and the second hand adjusts the knee, asymmetric bimanual posing module 302 computes how the leg should bend at the knee joint while keeping the hip stationary.

At step 1104, inverse kinematics solver 305 computes movements of the 3D object and adjusts other connected joints and bones. Following the asymmetric bimanual interactions by user 134, where one hand sets a reference joint and the other hand manipulates a different joint, inverse kinematics solver 305 ensures the overall pose remains coherent and anatomically plausible with respect to the hierarchical tree. Inverse kinematics solver 305 computes the adjustments for the entire kinematic chain affected by the manipulation, which in some cases can include all joints stored in nodes of the hierarchical tree data structure that are descendants of the node storing the fixed joint, ensuring that the movements are realistic and respect the physical limitations and capabilities of the 3D character body. For example, if user 134 positions one arm of the character to reach out while keeping the other arm stationary, inverse kinematics solver 305 assesses how the action impacts connected joints and bones, such as the shoulder, torso, hip joints, and/or the like, to maintain balance and natural posture. In particular, inverse kinematics solver 305 can compute the angles, distances, and inter-joint dependencies.

Figure 12:
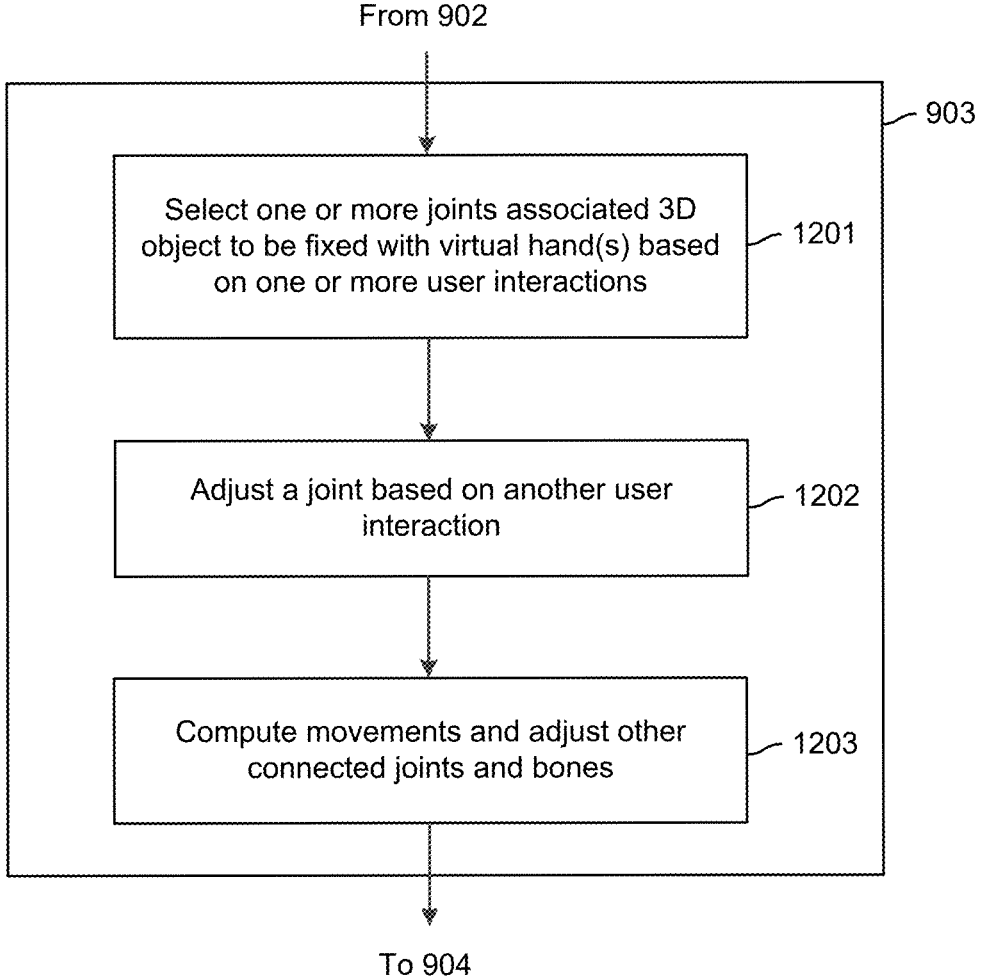
FIG. 12 is a flow diagram of method steps for manipulating a 3D object based on a virtual hands posing mode in the method of FIG. 9, according to various embodiments.

FIG. 12 is a flow diagram of method steps for manipulating a 3D object based on a virtual hands posing mode in step 903 of method 900, according to various embodiments of the method in FIG. 9. Although the method steps are described in conjunction with the systems of FIGS. 1-3, persons skilled in the art will understand that any system configured to perform the method steps, in any order, falls within the scope of the present invention.

As shown, at step 1201, virtual hands posing module 303 selects one or more joints associated with a 3D object to be fixed with virtual hand(s) based on one or more user 134 interactions. In response to a predefined interaction, such as user 134 pressing a button on a menu and/or the like, virtual hands module 303 records the current position of a hand of user 134 that is holding the 3D object. In some embodiments, asymmetric bimanual posing module 302 also determines, based on the user interaction(s) (e.g., based on how long user 134 presses a button), a strength of the virtual hand that affects whether the one or more joints are fixed in place or allowed to have some degree of movement. When user 134 withdraws the hand, a virtual hand remains in place that fixes a joint at a location and orientation within the virtual environment where the hand was holding the 3D object. For example, user 134 could affix the foot of a 3D character in a fixed pose to simulate standing or walking, while simultaneously manipulating the upper body of the 3D character to animate arm movements or torso rotations. In some embodiments, virtual hands posing module 303 allows user 134 to deploy multiple virtual hands, each offering different levels of holding strength. In some embodiments, virtual hands posing module 303 allows user 134 to modify or release the virtual holds as needed via other predefined interactions, for example, by re-engaging with the previously fixed joint and/or the like.

At step 1202, virtual hands posing module 303 adjusts a joint associated with the 3D object based on another user interaction. After establishing one or more joints in fixed positions using virtual hands at step 1201, user 134 can further interact with the 3D object to manipulate other parts of the 3D object. For example, user 134 could select and move a different joint that is not held by a virtual hand. Virtual hands posing module 303 dynamically responds to the new inputs of user 134, adjusting the pose in real-time while respecting the constraints imposed by the virtual hands.

At step 1203, inverse kinematics solver 305 computes movements of the 3D object and adjusts other connected joints and bones. Inverse kinematics solver computes the movements and makes adjustments to other connected joints and bones. Once a new joint position is determined by the user interaction, inverse kinematics solver 305 assesses the impact of the movement on the overall pose of the 3D object, especially focusing on how the movement affects joints and bones that are not fixed by the virtual hands, as described above in conjunction with FIG. 7. Inverse kinematics solver 305 ensures that any adjustments respect the physical limitations and mechanical properties of the 3D object hierarchical tree. For example, if user 134 raises an arm that is not fixed, inverse kinematics solver 305 computes the changes in the shoulder, elbow, and hand joints, along with any shifts in the torso to accommodate the movement, while keeping the joints fixed with virtual hands stationary.

Figure 13:
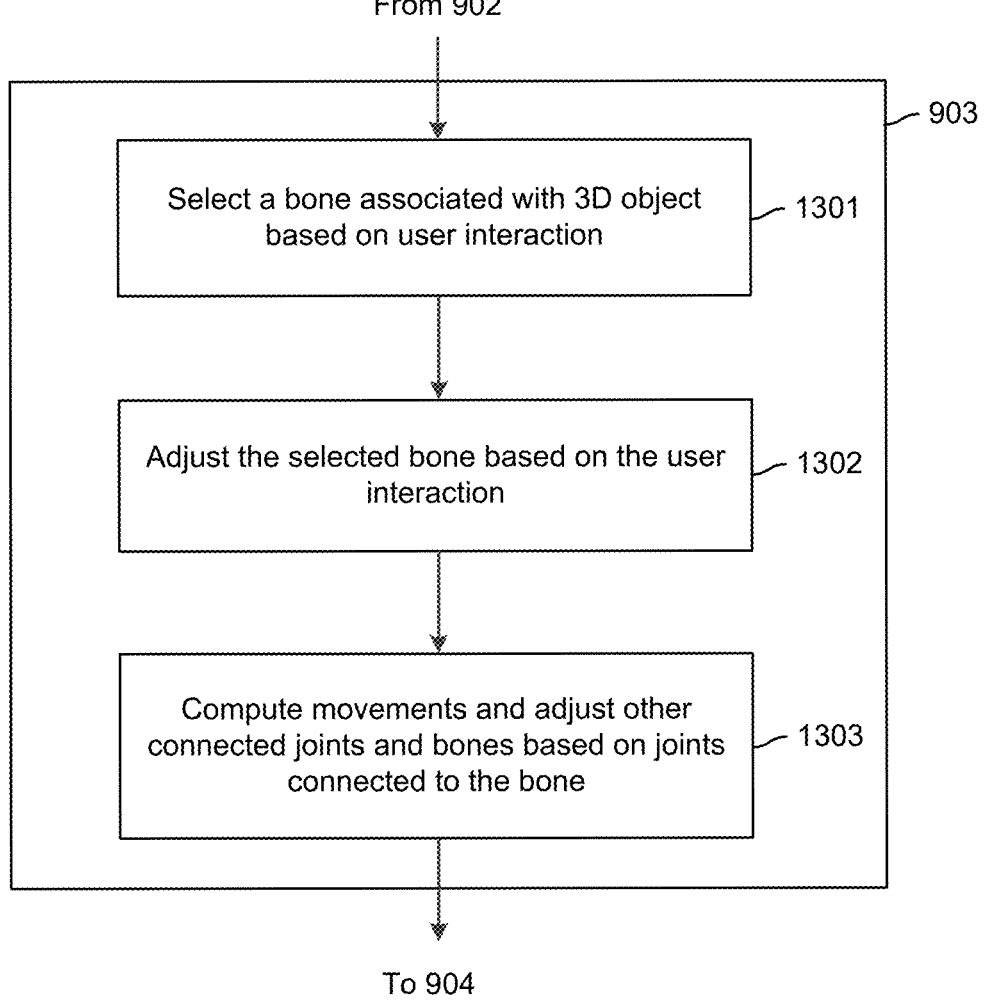
FIG. 13 is a flow diagram of method steps for manipulating a 3D object based on a bone manipulation mode in the method of FIG. 9, according to various embodiments.

FIG. 13 is a flow diagram of method steps for manipulating a 3D object based on a bone manipulation mode in step 903 of method 900, according to various embodiments. Although the method steps are described in conjunction with the systems of FIGS. 1-3, persons skilled in the art will understand that any system configured to perform the method steps, in any order, falls within the scope of the present invention.

As shown, at step 1301, bone manipulation module 304 selects a bone associated with the 3D object based on a user interaction. In various embodiments, user 134 interacts with a bone by grabbing, pinching, or otherwise interacting with a corresponding bounding box between two or more joints. For example, if user 134 interacts with a binary—link bone-such as a forearm bone or an upper thigh bone— manipulation module 304 selects the bounding box connecting proximal and distal joints of such a bone. In some embodiments, bone manipulation module 304 allows user 134 to use virtual hands, which user 134 can create to temporarily fix a bone in a specific spatial position and orientation. In some embodiments, bone manipulation module 304 allows user 134 to use asymmetrical manipulation, offering user 134 the versatility to hold one bone steady while actively adjusting other bones and/or joints.

At step 1302, bone manipulation module 304 adjusts the selected bone based on the user interaction. After identifying the target bone through the bounding box within the virtual environment at step 1301, bone manipulation module 304 processes the user bone manipulation to alter the pose of the 3D object. In some embodiments, the bone manipulation can include, but is not limited to, rotating, shifting, or bending the bone to achieve a desired pose.

At step 1303, inverse kinematics solver 305 computes movements of the 3D object and adjusts other connected joints and bones based on joints connected to the bone. Inverse kinematics solver 305 uses inverse kinematics to compute the movements and adjusts other connected joints and bones based on the joints connected to the bone that was manipulated by user 134. Inverse kinematics solver 305 considers the hierarchical tree of the 3D object, including how changes to one bone influence the position and orientation of adjacent joints and the associated linked bones. For example, if user 134 rotates the shoulder of a 3D character to raise an arm, inverse kinematics solver 305 could compute the adjustments for the elbow and hand joints.

In sum, the disclosed techniques enables posing of 3D objects in XR environments using two or more hands. In some embodiments, an animation application selects a posing mode based on one or more user interactions and adjusts the joints and/or bones associated with a 3D object based on the posing mode and the user interaction(s). The posing modes can include a symmetric bimanual posing mode in which two joints associated with a 3D object are selected and adjusted simultaneously. The posing modes can also include an asymmetric bimanual posing mode in which a user can select a reference joint with one hand to serve as a pivot or anchor while using another hand to adjust a second joint. The posing modes can further include a virtual hand posing mode in which a user can create virtual hands that are used to fix joints in place, enabling one hand to adjust other parts of the 3D object freely. In addition, the posing modes can include a bone manipulation mode in which a user can select and adjust bones directly, with adjustments to the bones influencing joints that are connected to the bones. The animation application uses an inverse kinematics solver to compute the kinematic consequences of the user interactions with the 3D object, to ensure that the resulting movements of joints and bones are both anatomically plausible and aligned with user intentions.

At least one technical advantage of the disclosed techniques relative to the prior art is the disclosed techniques permit the simultaneous manipulation of multiple joints or entire bones associated with a 3D object using two or more hands, which can include virtual hand(s). The simultaneous manipulation of multiple joints or entire bones using two or more hands enables relatively intuitive and efficient posing of 3D object within XR environments. Furthermore, the disclosed techniques allow users to pose 3D objects using gestures and movements that are instinctive and reflective of real-world interactions, which can enhance the realism and expressiveness of 3D object poses. These technical advantages represent one or more technological improvements over prior art approaches.

1. In some embodiments, a computer-implemented method for posing an object comprises receiving, within an extended reality (XR) environment, one or more interactions of a plurality of hands with at least one of one or more joints or one or more bones associated with the object, and computing one or more movements of at least one portion of the object based on the one or more interactions.

2. The computer-implemented method of clause 1, wherein the one or more interactions comprise (i) fixing of a first joint by a first hand of a user, and (ii) movement of a second joint by a second hand of the user, and wherein computing the one or more movements of the at least one portion of the object comprises computing, based on the movement of the second joint by the second hand, a movement of each joint other than the second joint that is a descendant of the first joint in a tree data structure.

3. The computer-implemented method of clauses 1 or 2, wherein the one or more interactions comprise (i) fixing of a first joint by a virtual hand, and (ii) movement of a second joint by a hand of a user, and wherein computing the one or more movements of the at least one portion of the object comprises computing, based on the movement of the second joint by the hand of user, a movement of each joint other than the second joint that is a descendant of the first joint in a tree data structure.

4. The computer-implemented method of any of clauses 1-3, further comprising determining, based on the one or more interactions, a strength with which the first joint is fixed by the virtual hand, wherein the movement of each joint other than the second joint that is a descendant of the first joint in the tree data structure is further computed based on the strength with which the first joint is fixed by the virtual hand.

5. The computer-implemented method of any of clauses 1-4, wherein the first joint is fixed at a plurality of poses over a plurality of frames.

6. The computer-implemented method of any of clauses 1-5, wherein the one or more interactions fix the first joint in a coordinate frame associated with another object.

7. The computer-implemented method of any of clauses 1-6, wherein the one or more interactions include an interaction of a hand of a user with a first bone associated with the object, and computing the one or more movements of the at least one portion of the object comprises determining one or more joints associated with the first bone, and computing one or more movements of the one or more joints based on the interaction of the hand of the user with the first bone.

8. The computer-implemented method of any of clauses 1-7, wherein the one or more interactions include a first interaction by a first hand of a user that occurs simultaneously with a second interaction by a second hand of the user.

9. The computer-implemented method of any of clauses 1-8, wherein the one or more interactions cause the at least one of one or more joints or one or more bones to be fixed in position and orientation.

10. The computer-implemented method of any of clauses 1-9, wherein the object is one of a three-dimensional (3D) virtual character or a robot.

11. In some embodiments, one or more non-transitory computer-readable media store instructions that, when executed by at least one processor, cause the at least one processor to perform the steps of receiving, within an extended reality (XR) environment, one or more interactions of a plurality of hands with at least one of one or more joints or one or more bones associated with an object, and computing one or more movements of at least one portion of the object based on the one or more interactions.

12. The one or more non-transitory computer-readable media of clause 11, wherein the one or more interactions comprise (i) fixing of a first joint by a first hand of a user, and (ii) movement of a second joint by a second hand of the user, and wherein computing the one or more movements of the at least one portion of the object comprises computing, based on the movement of the second joint by the second hand, a movement of each joint other than the second joint that is a descendant of the first joint in a tree data structure.

13. The one or more non-transitory computer-readable media of clauses 11 or 12, wherein the one or more interactions comprise (i) fixing of a first joint by a virtual hand, and (ii) movement of a second joint by a hand of a user, and wherein computing the one or more movements of the at least one portion of the object comprises computing, based on the movement of the second joint by the hand of user, a movement of each joint other than the second joint that is a descendant of the first joint in a tree data structure.

14. The one or more non-transitory computer-readable media of any of clauses 11-13, wherein the instructions, when executed by the at least one processor, further cause the at least one processor to perform the step of determining, based on the one or more interactions, a strength with which the first joint is fixed by the virtual hand, wherein the movement of each joint other than the second joint that is a descendant of the first joint in the tree data structure is further computed based on the strength with which the first joint is fixed by the virtual hand.

15. The one or more non-transitory computer-readable media of any of clauses 11-14, wherein the one or more interactions include an interaction of a hand of a user with a first bone associated with the object, and computing the one or more movements of the at least one portion of the object comprises determining one or more joints associated with the first bone, and computing one or more movements of the one or more joints based on the interaction of the hand of the user with the first bone.

16. The one or more non-transitory computer-readable media of any of clauses 11-15, wherein the one or more interactions include a first interaction of a first hand of a user with a first portion of the object that occurs simultaneously with a second interaction of a second hand of the user with a second portion of the object.

17. The one or more non-transitory computer-readable media of any of clauses 11-16, wherein the one or more interactions cause the at least one of one or more joints or one or more bones to be fixed in position and orientation by a plurality of virtual hands.

18. The one or more non-transitory computer-readable media of any of clauses 11-17, wherein the instructions, when executed by the at least one processor, further cause the at least one processor to perform the step of determine a manipulation mode based on the one or more interactions.

19. The one or more non-transitory computer-readable media of any of clauses 11-18, wherein the plurality of hands includes at least one hand of a user and at least one virtual hand, and wherein the at least virtual hand is created by one or more previous interactions of at least one hand of the user with at least one of one or more joints or one or more bones associated with the object.

20. In some embodiments, a system comprises one or more memories storing instructions, and one or more processors that are coupled to the one or more memories and, when executing the instructions, are configured to receive, within an extended reality (XR) environment, one or more interactions of a plurality of hands with at least one of one or more joints or one or more bones associated with an object, and compute one or more movements of at least one portion of the object based on the one or more interactions.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for posing an object, the method comprising:

generating, within an extended reality (XR) environment, a fixed virtual hand at a first location within the XR environment corresponding to a first position of a hand controlled by a user within the XR environment, wherein:

the fixed virtual hand pins a first joint of the object at the first location, and the fixed virtual hand remains at the first location when the hand controlled by the user moves to a second position within the XR environment;

receiving one or more interactions of at least the hand controlled by the user with at least one of one or more additional joints or one or more bones associated with the object; and computing one or more movements of at least one portion of the object based on at least the first joint at the first location and the one or more interactions.

2. The computer-implemented method of claim 1, wherein:

the one or more interactions comprise:

(i) fixing of a second joint by the hand controlled by the user, and (ii) movement of a third joint by a second hand controlled by the user, and computing the one or more movements of the at least one portion of the object comprises computing, based on at least the movement of the third joint by the second hand controlled by the user, a movement of each joint other than the third joint that is a descendant of the second joint in a tree data structure.

3. The computer-implemented method of claim 1, wherein:

the one or more interactions comprise movement of a second joint by the hand controlled by the user, and computing the one or more movements of the at least one portion of the object comprises computing, based on the movement of the second joint by the hand controlled by the user, a movement of each joint other than the second joint that is a descendant of the first joint in a tree data structure.

4. The computer-implemented method of claim 3, further comprising:

determining, based on the one or more interactions, a strength with which the first joint is pinned by the fixed virtual hand, wherein the movement of each joint other than the second joint that is a descendant of the first joint in the tree data structure is further computed based on the strength with which the first joint is pinned by the fixed virtual hand.

5. The computer-implemented method of claim 3, wherein the first joint is pinned at the first location for a plurality of poses over a plurality of frames.

6. The computer-implemented method of claim 3, wherein the one or more fixed virtual hand pins the first joint in a coordinate frame associated with another object.

7. The computer-implemented method of claim 1, wherein:

the one or more interactions include an interaction of the hand of the user with a first bone associated with the object, and computing the one or more movements of the at least one portion of the object comprises:

determining one or more joints associated with the first bone; and computing one or more movements of the one or more joints based on the interaction of the hand controlled by the user with the first bone.

8. The computer-implemented method of claim 1, wherein the one or more interactions include a first interaction by the hand controlled by the user that occurs simultaneously with a second interaction by a second hand controlled by the user.

9. The computer-implemented method of claim 1, wherein the one or more interactions cause the at least one of one or more additional joints or one or more bones to be fixed in position and orientation.

10. The computer-implemented method of claim 1, wherein the object is one of a three-dimensional (3D) virtual character or a robot.

11. One or more non-transitory computer-readable media storing instructions that, when executed by at least one processor, cause the at least one processor to perform the steps of:

generating, within an extended reality (XR) environment, a fixed virtual hand at a first location within the XR environment corresponding to a first position of a hand controlled by a user within the XR environment, wherein:

the fixed virtual hand pins a first joint of an object at the first location, and the fixed virtual hand remains at the first location when the hand controlled by the user moves to a second position within the XR environment;

receiving one or more interactions of at least the hand controlled by the user with at least one of one or more additional joints or one or more bones associated with the object; and computing one or more movements of at least one portion of the object based on at least the first joint at the first location and the one or more interactions.

12. The one or more non-transitory computer-readable media of claim 11, wherein:

the one or more interactions comprise:

(i) fixing of a second joint by the hand controlled by the user, and (ii) movement of a third joint by a second hand controlled by the user, and computing the one or more movements of the at least one portion of the object comprises computing, based on at least the movement of the third joint by the second hand controlled by the user, a movement of each joint other than the third joint that is a descendant of the second joint in a tree data structure.

13. The one or more non-transitory computer-readable media of claim 11, wherein:

the one or more interactions comprise movement of a second joint by the hand controlled by the user, and computing the one or more movements of the at least one portion of the object comprises computing, based on the movement of the second joint by the hand controlled by the user, a movement of each joint other than the second joint that is a descendant of the first joint in a tree data structure.

14. The one or more non-transitory computer-readable media of claim 13, wherein the instructions, when executed by the at least one processor, further cause the at least one processor to perform the step of:

determining, based on the one or more interactions, a strength with which the first joint is pinned by the fixed virtual hand, wherein the movement of each joint other than the second joint that is a descendant of the first joint in the tree data structure is further computed based on the strength with which the first joint is pinned by the fixed virtual hand.

15. The one or more non-transitory computer-readable media of claim 11, wherein:

the one or more interactions include an interaction of the hand of the user with a first bone associated with the object, and computing the one or more movements of the at least one portion of the object comprises:

determining one or more joints associated with the first bone; and computing one or more movements of the one or more joints based on the interaction of the hand controlled by the user with the first bone.

16. The one or more non-transitory computer-readable media of claim 11, wherein the one or more interactions include a first interaction of the hand controlled by the user with a first portion of the object that occurs simultaneously with a second interaction of a second hand controlled by the user with a second portion of the object.

17. The one or more non-transitory computer-readable media of claim 11, wherein the one or more interactions cause the at least one of one or more additional joints or one or more bones to be fixed in position and orientation by a plurality of virtual hands.

18. The one or more non-transitory computer-readable media of claim 11, wherein the instructions, when executed by the at least one processor, further cause the at least one processor to perform the step of determining a manipulation mode based on the one or more interactions.

19. A system, comprising:

one or more memories storing instructions; and one or more processors that are coupled to the one or more memories and, when executing the instructions, are configured to:

generate, within an extended reality (XR) environment, a fixed virtual hand at a first location within the XR environment corresponding to a first position of a hand controlled by a user within the XR environment, wherein:

the fixed virtual hand pins a first joint of the object at the first location, and the fixed virtual hand remains at the first location when the hand controlled by the user moves to a second position within the XR environment;

receive one or more interactions of at least the hand controlled by the user with at least one of one or more additional joints or one or more bones associated with an object; and compute one or more movements of at least one portion of the object based on at least the first joint and the first location and the one or more interactions.

\* \* \* \* \*